US005170052A

United States Patent [19]

Kato

[11] Patent Number: 5,170,052

[45] Date of Patent: Dec. 8, 1992

[54] APPARATUS FOR SAMPLE IONIZATION AND MASS SPECTROMETRY

[75] Inventor: Yoshiaki Kato, Mito, Japan

[73] Assignee: Hitachi, Ltd., Tokyo, Japan

[21] Appl. No.: 686,361

[22] Filed: Apr. 17, 1991

[30] Foreign Application Priority Data

Apr. 18, 1990 [JP] Japan .................................. 2-100323

[51] Int. Cl.[5] ........................ A01J 49/00; B01D 59/44

[52] U.S. Cl. ...................................... 250/288; 250/281

[58] Field of Search ..................... 250/281, 288, 288 A

[56] References Cited

U.S. PATENT DOCUMENTS 4,977,785 12/1990 Willoughby et al. ............... 250/288
4,996,424 2/1991 Mimura et al. ...................... 250/288

FOREIGN PATENT DOCUMENTS 338572 10/1989 European Pat. Off. .
362813 4/1990 European Pat. Off. .
2151021 7/1985 United Kingdom .

OTHER PUBLICATIONS

"Sample introduction techniques for Atomic Spectroscopy" Brownert et al., *Anal Chem.* vol. 56, No. 7, pp. 875A-888A.

"Monodisperse aerosol generation interface for combining liquid chrom. with m.s." Willoughby, *Anal. Chemistry,* vol. 56, No. 14, pp. 2626-2631.

*Primary Examiner*—Bruce C. Anderson
*Attorney, Agent, or Firm*—Antonelli, Terry, Stout & Kraus

[57] ABSTRACT

A device for ionizing a sample includes a space separated from the environment, and the sample is injected and nebulized into the space. Fluid introduction pathways are formed adjacent to a position where the sample is injected, so as to introduce fluid into the space. The introduced fluid is brought into contact with a flow of the injected sample, thereby promoting production of a mist of the sample having finer particles. Then, the pressure of the space is reduced, and the space is shaped to maintain its pressure-reduced condition. Since the space to which the sample is injected is separated from the environment, the fluid delivered to the flow of the injected sample is hardly influenced by turbulence of the environment, to thereby effect constant production of a fine mist and accordingly reliable ionizetion of the sample. An apparatus for mass spectrometry of the sample is constituted by combining this ionization device with a liquid chromatograph and other required system elements.

26 Claims, 5 Drawing Sheets

APPARATUS FOR SAMPLE IONIZATION AND MASS SPECTROMETRY

BACKGROUND OF THE INVENTION

The present invention relates to a device which ionizes a sample for the purpose of, for example, mass spectrometry, and a mass spectrometer apparatus with this ionization device.

A liquid chromatograph/mass spectrometer apparatus includes an ionization device serving as an interface between a liquid chromatograph and a mass analyzing unit. Liquid containing sample components and solvent is delivered from the liquid chromatograph into the ionization device where it is ionized for mass spectrometry. More specifically, the liquid from the liquid chromatograph is first introduced into a nebulizer of the ionization device and nebulized. The nebulized liquid is then delivered to a desolvation unit where the solvent molecules are separated from the sample molecules. The sample molecules are further transferred to a location as an ion source in which the sample molecules are ionized. Ions thus produced are delivered to the mass analyzing unit where they undergo mass separation and thereafter they are discharged out of the apparatus.

An example of commonly used or publicly known nebulizers is disclosed in *Analytical Chemistry*, 1988, vol. 60, pp. 774–780. This nebulizer includes a pipe having an inner diameter of 100 μm or so, and liquid from a liquid chromatograph is injected from the pipe and nebulized. The nebulized liquid is then introduced into a desolvation unit including a pipe whose inner diameter is about 5 mm.

In the conventional nebulizer described above, a space between the two pipes is open to the atmospheric pressure. The liquid is injected to this open space, causing friction between a flow of nebulized mist and the atmosphere. Due to this friction, the surrounding fluid is drawn into the nebulized mist flow, and actively collides with droplets of the nebulized mist, thus making the mist finer.

However, the nebulization space is directly open to the atmosphere, and consequently, drawing of the fluid into the mist in the nebulization space is directly influenced by turbulence of the environment caused by ventilation of the apparatus, temperature difference and the like. Accordingly, stability in ionization of a sample is unfavorably affected, resulting in a problem of deterioration in accuracy of mass spectrometry.

SUMMARY OF THE INVENTION

An object of the present invention is to provide a device by which a sample can be ionized reliably by constantly producing a mist of fine particles.

Another object of the invention is to provide an ionization device which can constantly produce a mist of fine particles by preventing fluid supply to the mist for being directly influenced by turbulence of the environment surrounding the device.

A further object of the invention is to provide a liquid chromatograph/mass spectrometer apparatus by which a sample can be ionized reliably so as to obtain high accuracy in mass spectrometry.

In order to achieve these objects, according to the present invention, a space to which a sample is injected is enclosed and separated from a surrounding fluid, and a fluid introduction pathway is formed to introduce the fluid into this space.

A device for ionizing a sample according to a first aspect of the present invention comprises means for injecting and nebulizing the sample, means for defining a space to which the sample is injected, means for introducing fluid into the space, and means for ionizing the nebulized sample. The introduction means include at least one opening adjacent to the injection means so as to bring the fluid into contact with the injected sample and promote nebulization of the sample. Further, the space defining means are shaped to surround the space and maintain a pressure-reduced condition in the space which is caused by contact between the injected sample and the fluid.

The space into which the sample is nebulized is enclosed and separated from the environment. The fluid is introduced into the space through the introduction means, and drawn into the injected sample. Therefore, the introduced fluid in this space is less affected by turbulence of the environment than in a nebulization space of a conventional type which is completely open to the atmosphere. As a result, particles of the nebulized sample can be constantly made finer, and ionization can be accordingly performed reliably.

The inner diameter of the space at a position where the sample is injected is preferably larger than that of an outlet through which the nebulized sample is delivered to the ionization means. More favorably, the inner diameter of the space is decreased gradually toward the outlet from the position where the sample is injected. For this reason, the space may be of a substantially conical shape which is suitable in respect of fluid resistance and production of the device.

For the fluid introduced into the space, there are preferably provided means for regulating an amount of the fluid and means for heating the fluid.

Moreover, it is favorable that the fluid introduction means are located in such a manner that the fluid is introduced in a direction inclined with respect to a flow of the injected sample. In a preferred embodiment, therefore, there is formed a fluid introduction pathway of a conical ring-like shape through which the fluid is supplied to the space.

According to a second aspect of the present invention, an apparatus for mass spectrometry of a sample is constituted by combining the above-described ionization device with a liquid chromatograph and other means required for mass spectrometry.

These and other objects, characteristics and advantages of the invention will be obviously understood from the following description of the preferred embodiments with reference to the attached drawings.

DETAILED DESCRIPTION OF THE PREFERRED EMBODIMENTS

The present invention will be hereinafter described in detail on the basis of the preferred embodiments with reference to the attached drawings.

Figure 1:
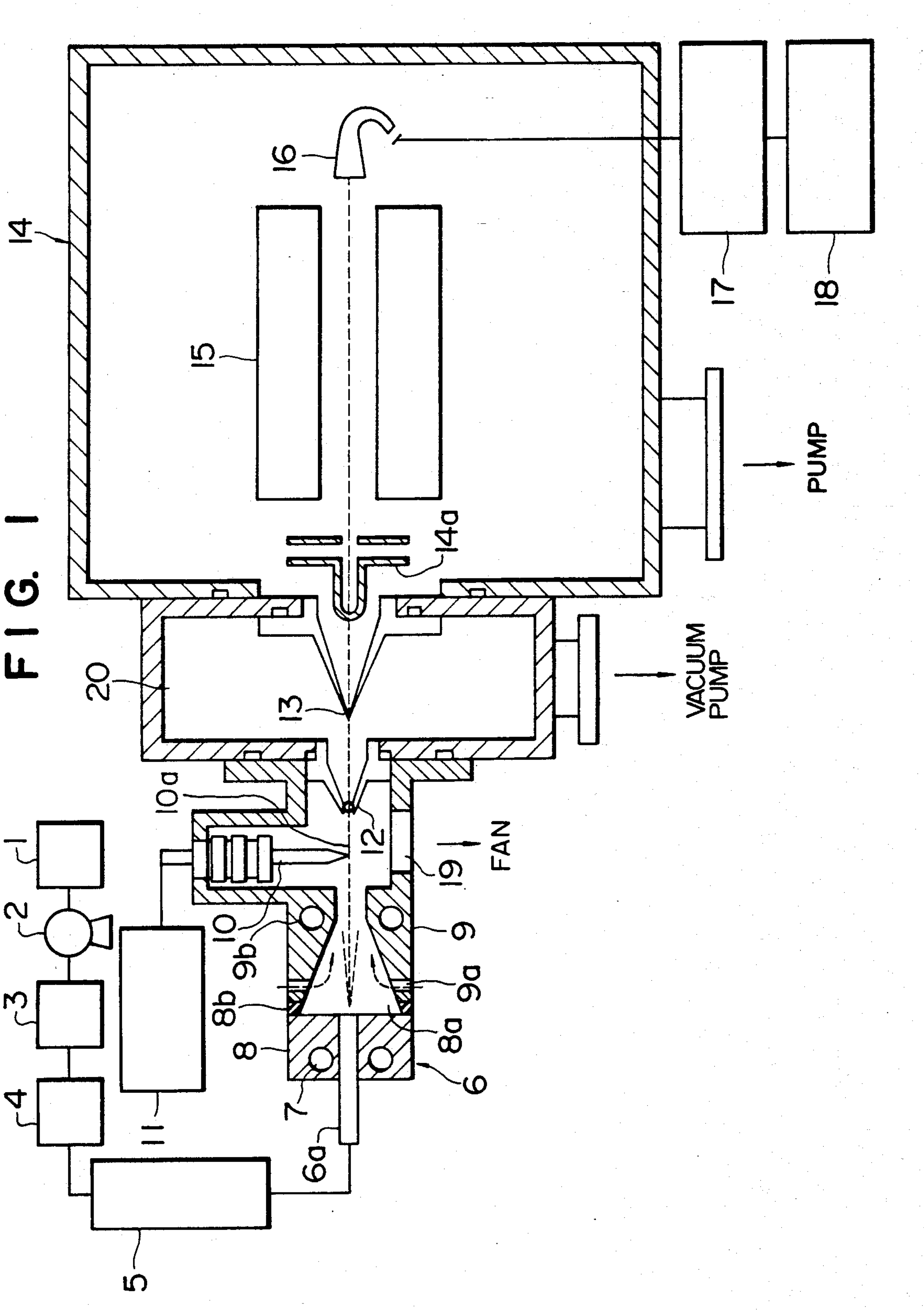
FIG. 1 is a schematic view showing the structure of a liquid chromatograph/mass spectrometer apparatus as a whole which includes an ionization device according to one embodiment of a first aspect of the present invention, the apparatus being one embodiment of a second aspect of the invention.

Referring to FIG. 1, a liquid chromatograph/ mass spectrometer includes an eluant tank 1, a pump 2, a damper 3, a sample introduction port 4, and a column 5, and these system elements are successively connected by pipe lines so as to deliver liquid through them. The column 5 is connected in turn to an interface 6 of the liquid chromatograph/mass spectrometer having an ionization device according to one embodiment of a first aspect of the present invention. The liquid chromatograph/mass spectrometer shown in FIG. 1 is one embodiment according to a second aspect of the invention.

The tank 1 contains an eluant of mobile phase, and the eluant is supplied from the tank 1 by the pump 2. The flow of the eluant becomes stable in the damper 3 where pulsating flows of the eluant are extinguished. Then, through the sample introduction port 4, the eluant is supplied to the column 5. Similarly, a sample is also introduced from the introduction port 4 to the column 5, and is separated into components in the column 5. Thereafter, the eluant is supplied to the interface 6.

The interface 6 comprises a micropipe 6*a*, a desolvation unit 9, a corona discharger 10*a*, and a differential pumping unit 20. The micropipe 6*a* is extended through a heat block 8, and one end of the micropipe 6*a* is communicated with the column 5. The other end of the micropipe 6*a* is open toward a nebulization space or chamber 8*a* of the desolvation unit 9. A heater 7 is provided within the heat block 8 so as to heat the micropipe 6*a*. The eluant is nebulized from the tip of the micropipe 6*a* toward the nebulization space 8*a*. A mist thus produced is heated and vaporized in the desolvation unit 9 provided with a heater 9*b*, and is then transmitted to the corona discharger 10*a*.

A high voltage is supplied from a power source 11 to a discharge needle 10 of the corona discharger 10*a*, and corona discharge is produced from the tip of the discharge needle 10. Solvent molecules of the liquid from the column 5 are first ionized by the corona discharge, and then, solute molecules, i.e. sample components of the liquid, are ionized by ion/molecule reactions. After the ion/molecule reactions, the eluant no longer required is discharged from an opening 19 of the corona discharger 10*a* into the atmosphere by means of a fan.

Ions thus produced are introduced into the differential pumping unit 20 through a first skimmer 12. At that time, the solvent molecules are separated and discharged out of the ionization device by a vacuum pump.

The ions are further delivered to a mass analyzing unit 14 to which the differential pumping unit 20 is connected through a second skimmer 13. In this mass analyzing unit 14, the ions enter a quadrupole 15 at a speed accelerated by an ion extracting electrode 14*a* so as to undergo mass separation and be determined by a detector 16. Output from the detector 16 is amplified by a direct current amplifier 17, and supplied to a data processor 18. Although the mass analyzing unit of the liquid chromatograph/mass spectrometer in this embodiment includes the quadrupole, the mass analyzing unit may be of a magnetic field type or the like.

An essential portion of the ionization device in this embodiment will now be described more specifically.

A member or block which defines the desolvation unit 9 is jointed with the heat block 8 through a thermal insulator 8*b*. Interposition of the thermal insulator 8*b* enables the micropipe 6*a* and the desolvation unit 9 to be heated up to their required respective temperatures.

A plurality of fluid intake holes 9*a* are perforated through side walls of the desolvation unit 9 which define the nebulization space 8*a*. These fluid intake holes 9*a* are extended substantially perpendicular to the micropipe 6*a* and located radially at equal angular intervals around a flow of mist nebulized from the micropipe 6*a*, one end of each hole being open in the vicinity of the tip of the micropipe 6*a*. Fluid surrounding the interface 6 is drawn into the vicinity of the nebulized mist flow via the fluid intake holes 9*a*.

The liquid from the column 5 is not vaporized within the micropipe 6*a* but nebulized all at once when it is discharged from the tip of the micropipe 6*a* into the nebulization space 8*a*. As shown in FIG. 1, the nebulization space 8*a* is of a conical shape in symmetry to the axis of the nebulized mist flow. It should be noted that the nebulization space 8*a* is formed in such a manner that its inner diameter is decreased gradually in a range from the tip of the micropipe 6*a* to the outlet of the solvent elimination unit 9, i.e., the nebulization space 8*a* is reduced in diameter at the outlet.

In the nebulization space 8*a*, friction is caused between the nebulized mist flow from the micropipe 6*a* and the sucked fluid, and the fluid is drawn into the nebulized mist flow according to Bernoulii's theorem. At this stage, the nebulization space 8*a* of the above-described shape serves to maintain the space at a pressure slightly lower than a pressure of the environment in order to ensure the supply of the fluid through the fluid intake holes 9*a*. As a result, collision of the nebulized mist with the drawn fluid is promoted so that droplets of the mist will be made finer. Such production of a fine mist leads to improvement of ionization efficiency and accordingly to improvement of sensitivity of mass spectrometry. In addition, when these fine droplets pass through the desolvation unit 9, they are heated and made even finer.

As clearly understood from the above, explanation, the nebulization space or chamber 8*a* is surrounded by the side walls of the desolvation unit 9, and it is not a space of a direct open type as in the conventional apparatus. Consequently, in comparison with a direct open type space, an intake of the fluid, i.e., an amount of supply of the fluid directed toward the nebulized mist flow is hardly affected by turbulence of the environment, thereby enabling reliable ionization.

Next, further embodiments of ionization devices according to the first aspect of the present invention will be described. In the following descriptions of the specification, the same component parts as those of the above embodiment are denoted by the common reference numerals, detailed explanations thereof being thus omitted.

Figure 2:
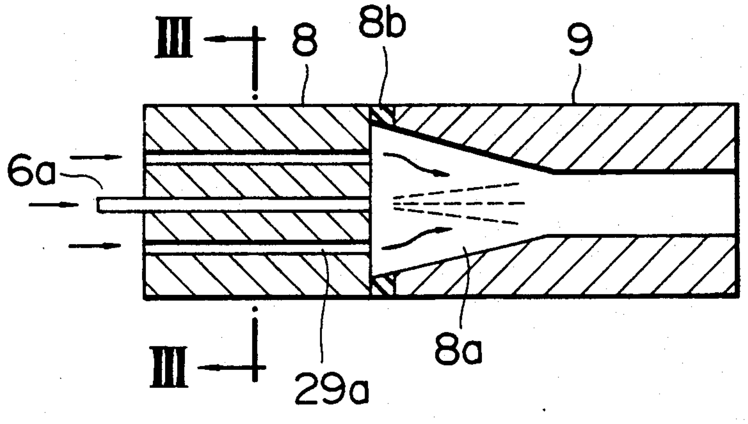
FIG. 2 is a cross-sectional view showing an essential portion of an ionization device according to another embodiment of the first aspect of the invention.
Figure 3:
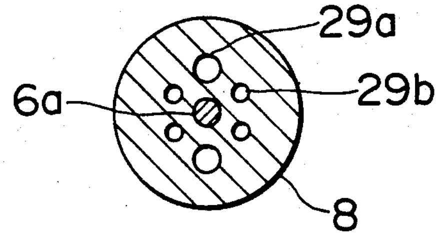
FIG. 3 is a cross-sectional view of the same taken along the line III—III of FIG. 2.

FIGS. 2 and 3 illustrate an essential portion of an ionization device according to a second embodiment of the invention. In this embodiment, a pair of fluid introduction holes 29*a* and a plurality of heater elements 29*b* are extended through the heat block 8 substantially in parallel to the micropipe 6*a*. As clearly shown in FIG. 3, the fluid introduction holes 29*a* are located on both sides of the micropipe 6*a*, and the heater elements 29*b* are located between these fluid introduction holes 29*a* around the micropipe 6*a*. As a result, fluid supplied into the nebulization space or chamber 8*a* is heated when it flows through the introduction holes 29*a* within the heat block 8*a*. The heated fluid collides with mist particles from the micropipe 6*a*, thus promoting the vaporization of the droplets.

The number of the fluid introduction holes 29*a* may be more than two so as to supply the fluid stably.

Figure 4:
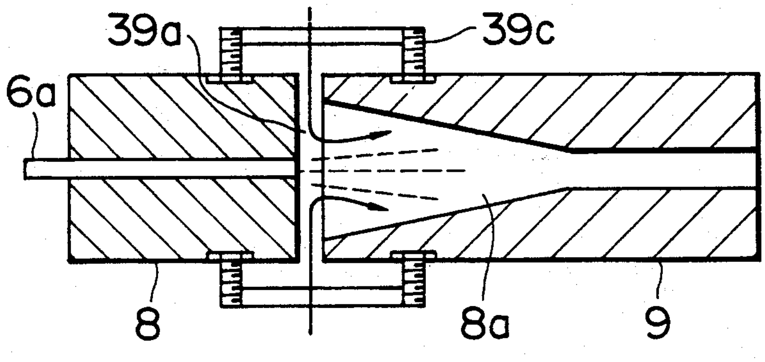
FIGS. 4 and 5 are cross-sectional views showing essential portions of ionization devices according to further embodiments of the first aspect of the invention.

FIG. 4 illustrates an essential portion of an ionization device according to a third embodiment of the invention. In the third embodiment, the heat block 8 and the desolvation unit 9 are slightly separated to have a gap 39*a* through which fluid is supplied toward a flow of nebulized mist. For this reason, the heat block 8 and the solvent elimination unit 9 are joined by an adjusting member 39*c* which is extended over these two units so that they are not in direct contact but separated from each other.

The adjusting member 39*c* is of a substantially hollow cylindrical shape, and the inner peripheries of both ends of the adjusting member 39*c* are screw-threaded. On the other hand, the outer periphery of the heat block 8 and the outer periphery of the desolvation unit 9 are similarly screw-threaded so that the adjusting member 39*c* is tightenedly screw-fitted to the heat block 8 at one end and to the solvent elimination unit 9 at the other end. The adjusting member 39*c* is screw-threaded in such a manner that it is screw-fitted to one of the heat block 8 and the solvent elimination unit 9 in the left-hand screw direction and screw-fitted to the other in the right-hand screw direction. Therefore, when the adjusting member 39*c* is rotated, the heat block 8 and the solvent elimination unit 9 are separated from each other or moved closer to each other, thus controlling the gap 39*a* between these two units. Openings are formed in most of the outer peripheral portion of the adjusting member 39*c* so as not to obstruct the flowing course of the fluid.

Figure 5:
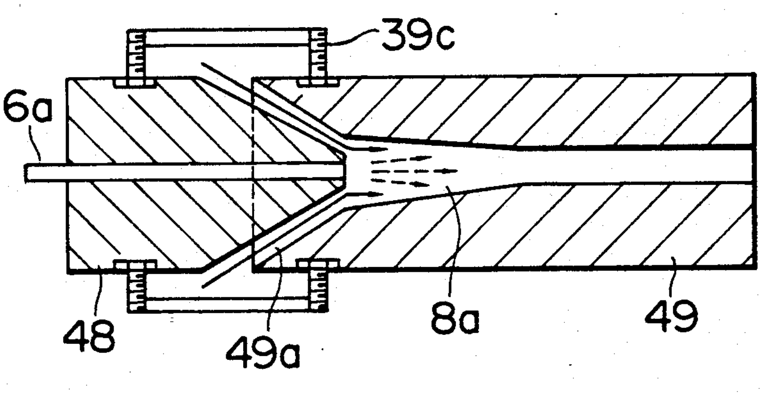

Referring to FIG. 5, an essential portion of an ionization device according to a fourth embodiment of the invention is similar to the essential portion of the third embodiment. In the fourth embodiment, a heat block 48 and a solvent elimination unit 49 are slightly separated to have a gap 49*a* through which fluid is supplied in the same manner as the third embodiment. However, the gap 49*a* of this embodiment is of a conical ring-like shape.

More specifically, the end portion of the heat block 48 which faces the nebulization space 8*a* is conically shaped, and the associated end portion of the solvent elimination unit 49 is conically recessed at substantially the same angle. The heat block 48 and the solvent elimination unit 49 are jointed with each other by the adjusting member 39*c* in the same manner as the third embodiment, while defining the gap 49*a* of a conical ring-like shape between the complementarily shaped end portions of these two units. In this embodiment, the gap 49*c* which is a fluid intake pathway is inclined with respect to a flow of nebulized mist, and accordingly, fluid can be introduced more stably. It is preferred that the fluid intake pathway is formed to supply the fluid toward the nebulized mist to flow smoothly and stably and to heat the fluid for a sufficiently long period of time during the supply of the fluid.

Furthermore, in either of the embodiments shown in FIGS. 4 and 5, the size of the gap 39*a* or 49*a* for fluid introduction is an important factor for production of the mist having finer droplets and also for reliable ionization.

Figure 6:
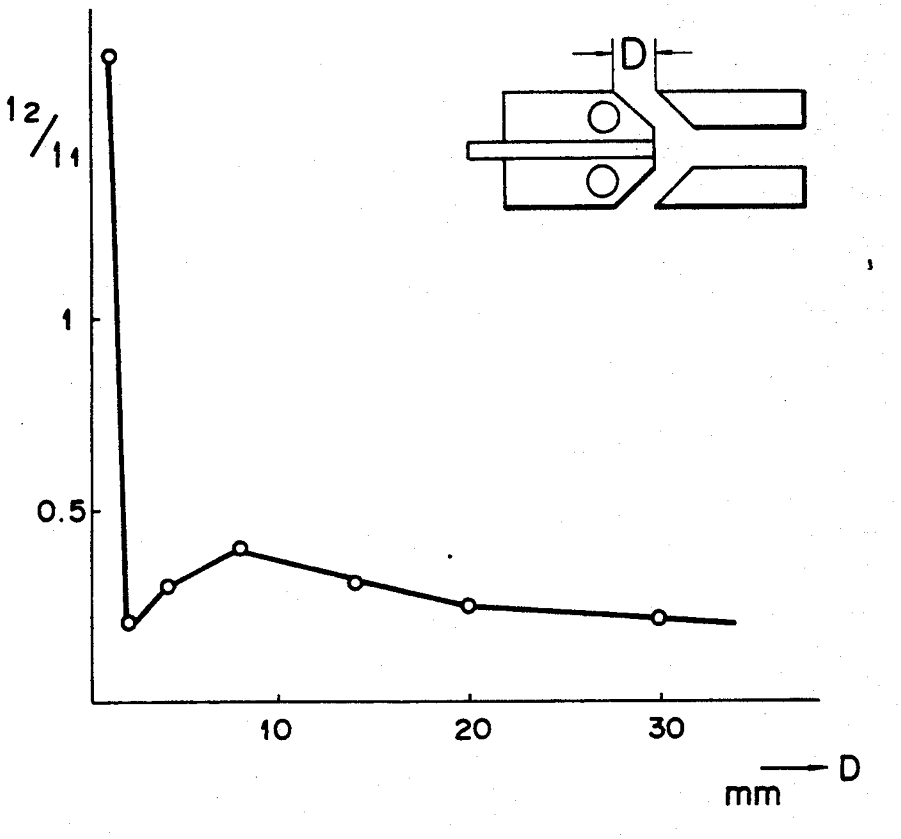
FIG. 6 is a graph illustrative of a relationship between an ion intensity ratio $I_2/I_1$ and a distance D of a gap for fluid introduction in the embodiment shown in FIG. 5.
Figure 7:
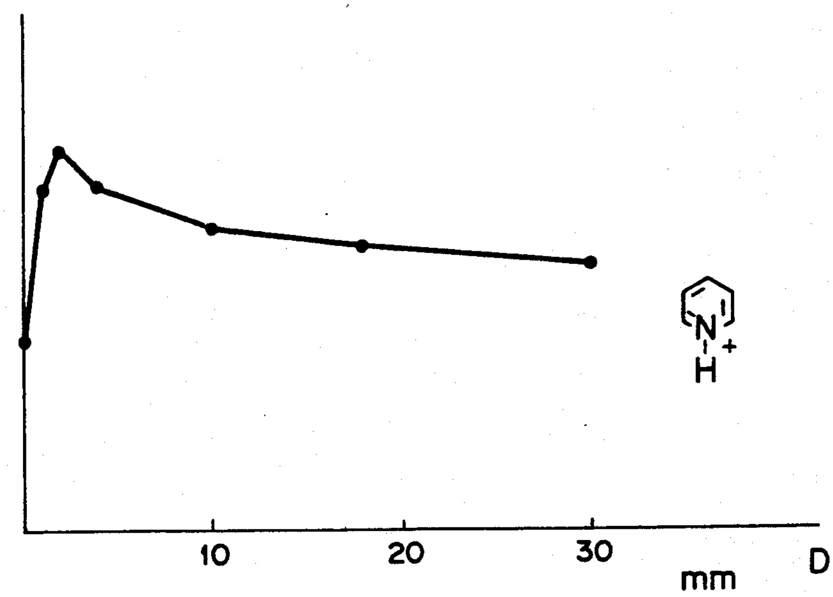
FIG. 7 is a graph illustrative of a relationship between an ion current of quasi-molecular ions and the distance D in the embodiment shown in FIG. 5.
Figure 8:
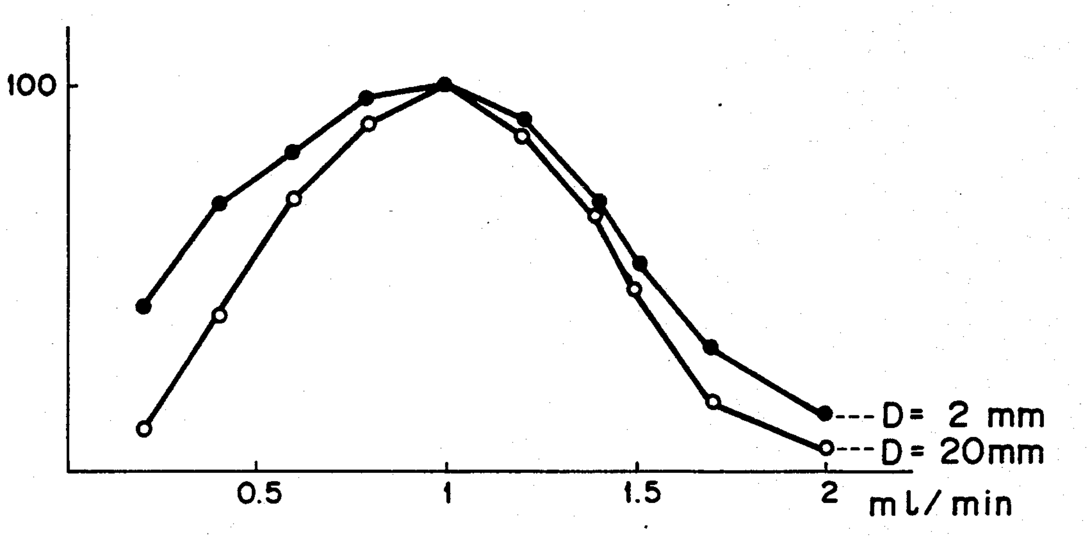
FIG. 8 is a graph illustrative of a relationship between an ion current of pyridine quasimolecular ions and a flow rate of eluant of moving phase in the embodiment shown in FIG. 5.

FIGS. 6 to 8 are graphs showing results of tests conducted by the inventors of the present application so as to investigate the influence of the size of the above-described gap. A liquid chromatograph/mass spectrometer including the ionization device shown in FIG. 5 was used to perform these tests. FIG. 6 illustrates a relationship between a distance D of the gap for fluid introduction and cluster ions detected with the mass spectrometer. A test was performed under the following measurement conditions: the eluant of mobile phase was water 100%; the temperature of the heat block was 320° C.; and the temperature of the desolvation unit was 400° C.

In this test, when water was injected, ions of $\{H_3O(H_2O)n\}+(n=0-10)$ appeared on the mass spectrum. FIG. 6 shows a relationship between an ion intensity ratio $I_2/I_1$ of an intensity $I_1$ of ions of $\{H_3O(H_2O)\}+$ and an intensity $I_2$ of ions of $\{H_3O(H_2O)_5\}+$ and the distance D. As easily understood from the graph, when the distance D was 1 mm or less, the intensity $I_2$ of ions of $\{H_3O(H_2O)_5\}+$ was higher than the intensity $I_1$ of ions of $\{H_3O(H_2O)\}+$. However, when the distance D was 2 mm, the ratio $I_2/I_1$ was decreased drastically. After the distance D exceeded 2 mm, the ratio $I_2/I_1$ was slightly increased, but after the distance D exceeded 10 mm, the ratio $I_2/I_1$ was decreased again.

FIG. 7 illustrates a relationship between an ion current of quasi-molecular ions (area value) and the distance D when 100 nanograms of pyridine was introduced under the same conditions as the test whose results are shown in FIG. 6. In this test, the ion-current of quasi-molecular ions was at its maximum when the distance D was 2 mm, and the sensitivity was decreased gradually as the distance D was increased. Ordinates of FIG. 7 indicate arbitrary units.

FIG. 8 illustrates a relationship between an ion current (peak area) of pyridine quasi-molecular ions (m/z 80) and a flow rate of the eluant of mobile phase when the distance D was 2 mm and 20 mm. In this test, the temperature of the heat block was set to such a value that the ion current would be at its maximum when the flow rate was 1 ml/min, and the temperature was maintained at this value throughout the test. Results of the test are plotted in FIG. 8 with the ion current of pyridine quasi-molecular ions when the flow rate was 1 ml/min being 100. In this graph, it was when the flow rate was 0.5 ml/min and 1.5 ml/min that the ion current was as low as 50% in the case of the distance D being 20 mm. On the other hand, in the case of the distance D being 2 mm, it was when the flow rate was 0.3 ml/min and 1.6 ml/min that the ion current was as low as 50%. It can be understood from this result that the liquid chromatograph/mass spectrometer is for use in a wider range when the distance D is set to 2 mm.

From these test results, it can be deduced that the ion current is low at the distance D in a range from 0 mm when the heat block and the solvent elimination unit are closely fitted to each other to 1 mm because the mist cannot have fine particles due to negative pressure in the nebulization chamber to thereby increase the size of cluster ions. Therefore, the sensitivity of pyridine becomes insufficient. On the other hand, when the distance D is increased, the fluid is adequately supplied, and droplets of the mist can be made finer, thus lessening the size of cluster ions. However, the amount of the supplied fluid is large, and the temperature of the supplied fluid is relatively low, thereby setting a limit to promotion of fineness of the mist. It can be deduced that the amount of the supplied fluid is adequate when the distance D is 2 mm, and that the fluid is sufficiently heated while it flows through the gap so as to make the mist finer. It can be concluded that this is how the number of cluster ions is decreased and the number of ions to be analyzed is increased.

Figure 9:
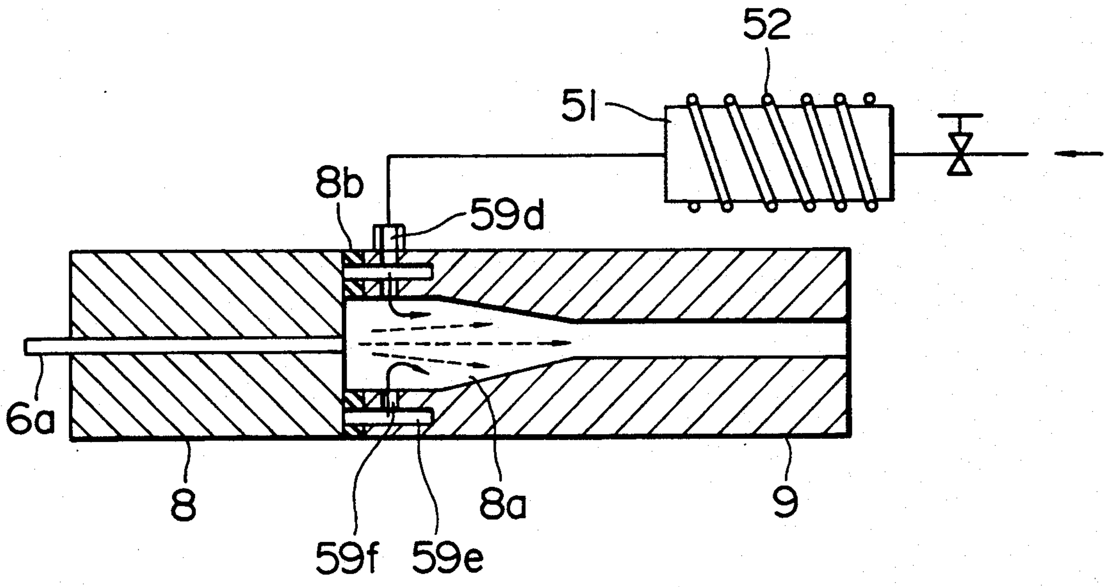
FIG. 9 is a cross-sectional view showing an essential portion of an ionization device according to a still other embodiment of the first aspect of the invention.

FIG. 9 illustrates an essential portion of an ionization device according to a fifth embodiment of the present invention. The above-described first to fourth embodiments are of a natural supply type in which the pressure reduction phenomenon induced by the nebulized mist flowing through the nebulization chamber is utilized for supplying the surrounding fluid. On the other hand, in the fifth embodiment, fluid is controlled to be forcibly supplied. More specifically, a fluid pathway 59*e* of such an annular shape as to surround the nebulization chamber 8*a* is formed within the side walls of the desolvation unit 9, and a fluid inlet 59*d* in communication with the pathway 59*e* is formed in an outer peripheral portion of the desolvation unit 9. A plurality f fluid outlets 59*f* are dispersedly formed in an inner peripheral portion of the nebulization chamber 8*a*. The outlets 59*f* are in communication with the pathway 59*e* and open toward the nebulization chamber 8 *a* in the vicinity of the tip of the micropipe 6*a*. Further, there is provided a fluid reservoir 51 in which fluid such as nitrogen and helium is stored at a pressure more than one atmospheric pressure. The fluid reservoir 51 is connected to the fluid inlet 59*d* from which the fluid is forcibly supplied through the pathway 59*e* and the outlets 59*f* into the nebulization chamber 8*a*. In FIG. 9, reference numeral 52 denotes a heater which heats the fluid reservoir 51.

When the fluid is stored in the reservoir 51 at one atmospheric pressure, the fluid is fed from the reservoir 51 to the nebulization chamber 8*a* in accordance with a pressure-reduced condition of the nebulization chamber 8 *a* in the same manner as the natural supply type embodiments described previously.

Although the present invention has been explained heretofore on the basis of the embodiments, it goes without saying that the invention is not restricted to these particular embodiments, and that various modifications can be added to them or they can be turned into alternative forms within a scope of the appended claim for a patent.

For example, the ionization device according to the present invention is applied to the liquid chromatograph/mass spectrometer in the above description. However, it can be used in an SFC/MS (supercritical fluid chromatograph/mass spectrometer) and a capillary zone electrophoresis/mass spectrometer, and it can be also used as a detector for a liquid chromatograph.

What is claimed is:

1. An apparatus for ionizing a sample comprising:

means for injecting and nebulizing the sample;

means for defining a space to which the sample is injected;

means for introducing fluid into said space, said introduction means including at least one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid, wherein the fluid is drawn into said space from the outside due to the pressure-reduced condition of said space; and means for ionizing the nebulized sample.

2. An apparatus according to claim 1, further including means for regulating an amount of the fluid introduced into said space.

3. An apparatus according to claim 2, wherein said regulation means regulate the amount of the fluid introduced into said space by controlling the dimensions of the opening of said introduction means.

4. An apparatus according to claim 1, further including means for heating the fluid introduced into said space.

5. An apparatus according to claim 4, wherein said heating means are located adjacent to said introduction means so as to heat the fluid flowing through said introduction means.

6. An apparatus according to claim 1, wherein said introduction means include a plurality of fluid introduction pathways extending substantially perpendicular to a flow of the injected sample, each of said fluid introduction pathways being open to the outside of said space so as to introduce the outside fluid into said space.

7. An apparatus according to claim 6, wherein said fluid introduction pathways are located radially at substantially equal angular intervals around the flow of the injected sample.

8. An apparatus according to claim 1, wherein said injection means include a micropipe for supplying the sample which is open in said space, said introduction means including a plurality of fluid introduction pathways adjacent to said micropipe and substantially in parallel to said micropipe, each of said fluid introduction pathways being open to the outside of said space so as to introduce the outside fluid into said space.

9. An apparatus according to claim 8, wherein said introduction means include a pair of said fluid introduction pathways, which are located on both side of said micropipe.

10. An apparatus according to claim 8, further including means for heating the fluid introduced into said space, said heating means being located between said fluid introduction pathways so as to surround said micropipe.

11. An apparatus according to claim 1, wherein said introduction means are located in such a manner that the fluid is introduced in a direction inclined with respect to a flow of the injected sample.

12. An apparatus according to claim 1, wherein said space includes an outlet through which the nebulized sample is transferred to said ionization means, the inner diameter of said space at a position where the sample is injected being larger than that of said outlet.

13. An apparatus according to claim 12, wherein the inner diameter of said space is gradually decreased toward said outlet from the position where the sample is injected.

14. An apparatus according to claim 1, wherein said space is of a substantially conical shape.

15. An apparatus according to claim 1, wherein said injection means include a heat block having a pathway for supplying the sample and a heater for heating the sample, said space defining means including a member which encloses said space so as to separate said space from the surrounding fluid, said space being defined by said member in cooperation with said heat block.

16. An apparatus according to claim 15, wherein said heat block and said member are fixedly jointed through a thermal insulator interposed therebetween.

17. An apparatus for ionizing a sample comprising:

means for injecting and nebulizing the sample;

means for defining a space to which the sample is injected;

means for introducing fluid into said space, said introduction means including at least one opening adjacent to said injection means so as to bring the fluid into contact with the injected sample and promote nebulization of the sample;

said space defining mans being shaped to surround said space and maintain a pressure-reduced condition of said space which is caused by contact between the injected sample and the fluid; and means for ionizing the nebulized sample;

wherein said injection means include a heat block having a pathway for supplying the sample and a heater for heating the sample, said space defining means including a member which encloses said space so as to separate said space from the surrounding fluid, said space being defined by said member in cooperation with said heat block; and wherein said heat block and said member are separated to have a gap therebetween, said introduction means being the gap between said heat block and said member.

18. An apparatus according to claim 17, further including means for adjusting said gap between said heat block and said member.

19. An apparatus for ionizing a sample comprising:

means for injecting and nebulizing the sample;

means for defining a space to which the sample is injected;

means for introducing fluid into said space, said introduction means including at least one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid; and means for ionizing the nebulized sample;

wherein said injection means include a heat block having a pathway for supplying the sample and a heater for heating the sample, said space defining means including a member which encloses said space so as to separate said space from the surrounding fluid, said space being defined by said member in cooperation with said heat block; and wherein the end portion of said heat block which faces said member is substantially conically shaped, the end portion of said member which faces said hat block being correspondingly conically recessed, said gap being of a conical ring-like shape inclined with respect to a flow of the injected sample.

20. An apparatus according to claim 19, further including means for adjusting said gap between said heat block and said member.

21. An apparatus according to claim 20, wherein said space is of a substantially conical shape.

22. An apparatus for ionizing a sample comprising;

means for injecting and nebulizing the sample;

means for defining a space to which the sample is injected;

means for introducing fluid into said space, said introduction means including at lest one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid; and means for ionizing the nebulized sample;

wherein said injection means include a heat block, a micropipe for supplying the sample which extends through said heat block, and a heater for heating the sample, said space defining means including a member which encloses said space so as to separate said space from the surrounding fluid, said member and said heat block being fixedly jointed through a thermal insulator interposed therebetween so as to define the space of a substantially conical shape, said introduction means including a plurality of fluid introduction pathways which extend through said member, said fluid introduction pathways being located radially at substantially equal angular intervals around a flow of the injected sample, while extending substantially perpendicular to the flow of the injected sample, each of said fluid introduction pathways being open to the outside of said space so as to introduce the outside fluid into said space.

23. An apparatus for ionizing a sample comprising:

means for injecting and nebulizing the sample;

means for defining a space to which the sample is injected;

means for introducing fluid into said space, said introduction means including at least one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid; and means for ionizing the nebulized sample;

wherein said injection means include a heat block, a micropipe for supplying the sample which extends through said heat block, and a heater for heating the sample, said space defining means including a member which encloses said space so as to separate said space from the surrounding fluid, said member and said hat block being fixedly jointed through a thermal insulator interposed therebetween so as to define the space of a substantially conical shape, said introduction means including a pair of fluid introduction pathways which extend through said heat block substantially in parallel to said micropipe, said heater also serving to heat the fluid flowing through said fluid introduction pathways.

24. An apparatus for ionizing a sample comprising:

means for injecting and nebulizing the sample;

mans for defining a space to which the sample is injected;

means for introducing fluid into said space, said introduction means including at least one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid; and means for ionizing the nebulized sample;

wherein said injection means include a heat block, a micropipe for supplying the sample which extends through said heat block, and a heater for heating the sample, said space defining means including a member which encloses said space so as to separate said space from the surrounding fluid, said member in cooperation with said heat block defining said space of a substantially conical shape, said heat block and said member being relatively movable to have a variable gap therebetween, said introduction means being the gap between said hat block and said member.

25. An apparatus for ionizing a sample comprising:

means for injecting and nebulizing the sample;

means for defining a space to which the sample is injected;

means for introducing fluid into said space, said introduction means including at least one opening adjacent to said injection means so as to bring the fluid into contact with the injected sample and promote nebulization of the sample;

said space defining means being shaped to surround said space and maintain a pressure-reduced condition of said space which is caused by contact between the injected sample and the fluid; and means for ionizing the nebulized sample;

wherein said injection means include a heat block, a micropipe for supplying the sample which extends through said heat block, and a heater for heating the sample, said space defining means including a member which encloses said space so as to separate said space from the surrounding fluid, said member in cooperation with said hat block defining said space of a substantially conical shape, said heat block and said member being relatively movable to have a variable gap therebetween, the end portion of said heat block which faces said member being substantially conically shaped, the end portion of said member which faces said hat block being correspondingly conically recessed, said gap being of a conical ring-like shape inclined with respect to a flow of the injected sample, said introduction means being the gap between said heat block and said member.

26. An apparatus for mass spectrometry of a sample comprising:

a liquid chromatograph;

means for injecting and nebulizing liquid containing components of the sample and solvent which is supplied from said liquid chromatograph;

means for defining a space to which the liquid is injected;

means for introducing fluid into said space, said introduction means including at least one opening adjacent to said injection means so as to bring the fluid into contact with the injected liquid and promote nebulization of the liquid;

said space defining means being shaped to surround said space and maintain a pressure-reduced condition of said space which is caused by contact between the injected liquid and the fluid, wherein the fluid is drawn into said space from the outside due to the pressure-reduced condition of said space;

means for separating and removing the solvent molecules from the sample molecules in the nebulized liquid;

means for ionizing the sample components supplied from said solvent separating/removing means;

means for mass spectrometry of ions thus produced; and means for detecting the ions which have undergone mass spectrometry.

* * * * *